(12) United States Patent
Byun et al.

(10) Patent No.: US 10,954,409 B2
(45) Date of Patent: Mar. 23, 2021

(54) HARD COATING FILM

(71) Applicant: LG CHEM, LTD., Seoul (KR)

(72) Inventors: Jin Seok Byun, Daejeon (KR); Jae Young Kim, Daejeon (KR); Yeong Rae Chang, Daejeon (KR); Yun U Shin, Daejeon (KR); Kwangseok Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/718,864

(22) Filed: Dec. 18, 2019

(65) Prior Publication Data

US 2020/0148911 A1 May 14, 2020

Related U.S. Application Data

(63) Continuation-in-part of application No. PCT/KR2018/010870, filed on Sep. 14, 2018.

(30) Foreign Application Priority Data

Sep. 15, 2017 (KR) .................. 10-2017-0118861

(51) Int. Cl.
*C09D 135/02* (2006.01)
*C09D 5/00* (2006.01)
(Continued)

(52) U.S. Cl.
CPC .......... *C09D 135/02* (2013.01); *C09D 5/006* (2013.01); *C08K 3/36* (2013.01); *C08K 9/06* (2013.01); *C08K 2201/005* (2013.01)

(58) Field of Classification Search
CPC ........ C09D 135/02; C09D 5/006; C09D 7/62; C09D 7/61; C09D 7/67; C09D 4/00;
(Continued)

(56) References Cited

U.S. PATENT DOCUMENTS

2004/0032546 A1* 2/2004 Ito .................. G02F 1/1335
349/96
2004/0071937 A1 4/2004 Chien et al.
(Continued)

FOREIGN PATENT DOCUMENTS

CN 101475774 A 7/2009
CN 103013205 A 4/2013
(Continued)

OTHER PUBLICATIONS

Extended European Search Report issued for corresponding European Patent Application No. 18855911.6. dated Jun. 22, 2020, 10 pages.
(Continued)

*Primary Examiner* — Nathan L Van Sell
(74) *Attorney, Agent, or Firm* — Rothwell, Figg, Ernst & Manbeck, P.C.

(57) ABSTRACT

A hard coating film including: a polymer binder resin; first inorganic particles which are dispersed in the polymer binder resin and have an average particle size of 5 nm or more and less than 70 nm; and second inorganic particles which are dispersed in the polymer binder resin and have an average particle size of 70 nm to 150 nm, wherein a content of the second inorganic particles having an average particle size of 70 nm to 150 nm is 4% by weight to 12% by weight, and a maximum amplitude (A) based on an average friction force is 0.15 or less in a graph of measuring a friction force with a TAC film which is measured by applying a load of 400 g to the surface thereof, is provided.

17 Claims, 1 Drawing Sheet

(51) Int. Cl.
*C08K 3/36* (2006.01)
*C08K 9/06* (2006.01)

(58) Field of Classification Search
CPC ...... C08K 3/36; C08K 9/06; C08K 2201/005;
C08K 2201/011; C08K 3/22; C08K 9/04;
C08J 7/0427; C08J 2433/14; G02B 1/14;
B32B 27/308; B32B 27/38; B32B 27/30;
B32B 3/30; B32B 27/20; B32B 7/02
See application file for complete search history.

(56) References Cited

U.S. PATENT DOCUMENTS

| | | |
|---|---|---|
| 2005/0070632 A1 | 3/2005 | Chien et al. |
| 2010/0112296 A1 | 5/2010 | Yoshihara et al. |
| 2010/0143674 A1 | 6/2010 | Yoshihara et al. |
| 2010/0167068 A1 | 7/2010 | Horio |
| 2013/0115469 A1 | 5/2013 | Hayashi et al. |
| 2013/0122253 A1 | 5/2013 | Yoshihara et al. |
| 2013/0251948 A1* | 9/2013 | Lyons ............... B08B 17/065 428/148 |
| 2015/0132552 A1 | 5/2015 | Kang et al. |
| 2015/0139259 A1 | 5/2015 | Robinson |
| 2015/0203711 A1 | 7/2015 | Kang et al. |
| 2015/0252210 A1 | 9/2015 | Kang et al. |
| 2016/0115340 A1 | 4/2016 | Hashimoto et al. |
| 2018/0231688 A1 | 8/2018 | Byun et al. |
| 2018/0364396 A1 | 12/2018 | Jang et al. |
| 2018/0372917 A1 | 12/2018 | Kim |

FOREIGN PATENT DOCUMENTS

| | | |
|---|---|---|
| CN | 104487497 A | 4/2015 |
| CN | 104736609 A | 6/2015 |
| CN | 107360718 A | 11/2017 |
| CN | 108025526 A | 5/2018 |
| JP | 2004-139013 A | 5/2004 |
| JP | 2009-132880 A | 6/2009 |
| JP | 2009-163260 A | 7/2009 |
| JP | 2010-085985 A | 4/2010 |
| JP | 2010-102123 A | 5/2010 |
| JP | 2012-066477 A | 4/2012 |
| JP | 2012-173627 A | 9/2012 |
| JP | 5103824 B2 | 12/2012 |
| JP | 2013-156638 A | 8/2013 |
| JP | 2014-148114 A | 8/2014 |
| JP | 2015-067682 A | 4/2015 |
| JP | 2015-108826 A | 6/2015 |
| JP | 2016-001320 A | 1/2016 |
| JP | 2017-042967 A | 3/2017 |
| JP | 2017-080951 A | 5/2017 |
| JP | 2017-139061 A | 8/2017 |
| KR | 10-0785380 B1 | 12/2007 |
| KR | 10-2010-0073365 A | 7/2010 |
| KR | 10-2010-0124477 A | 11/2010 |
| KR | 10-2011-0013547 A | 2/2011 |
| KR | 10-2013-0077185 A | 7/2013 |
| KR | 10-1342267 B1 | 12/2013 |
| KR | 10-2014-0101954 A | 8/2014 |
| KR | 10-1532545 B1 | 6/2015 |
| KR | 10-2015-0092202 A | 8/2015 |
| KR | 10-2015-0136179 A | 12/2015 |
| KR | 10-2017-0052479 A | 5/2017 |
| KR | 10-2017-0065459 A | 6/2017 |
| KR | 10-2017-0084939 A | 7/2017 |
| WO | 2008-123257 A1 | 10/2008 |
| WO | 2012-066743 A1 | 5/2012 |
| WO | 2013-146477 A1 | 10/2013 |
| WO | 2017-073316 A1 | 5/2017 |
| WO | 2019/054806 A1 | 3/2019 |

OTHER PUBLICATIONS

PCT Search Report & Written Opinion issued for PCT Application No. PCT/KR2018/010870 dated Jan. 17, 2019, 12 pages.

* cited by examiner

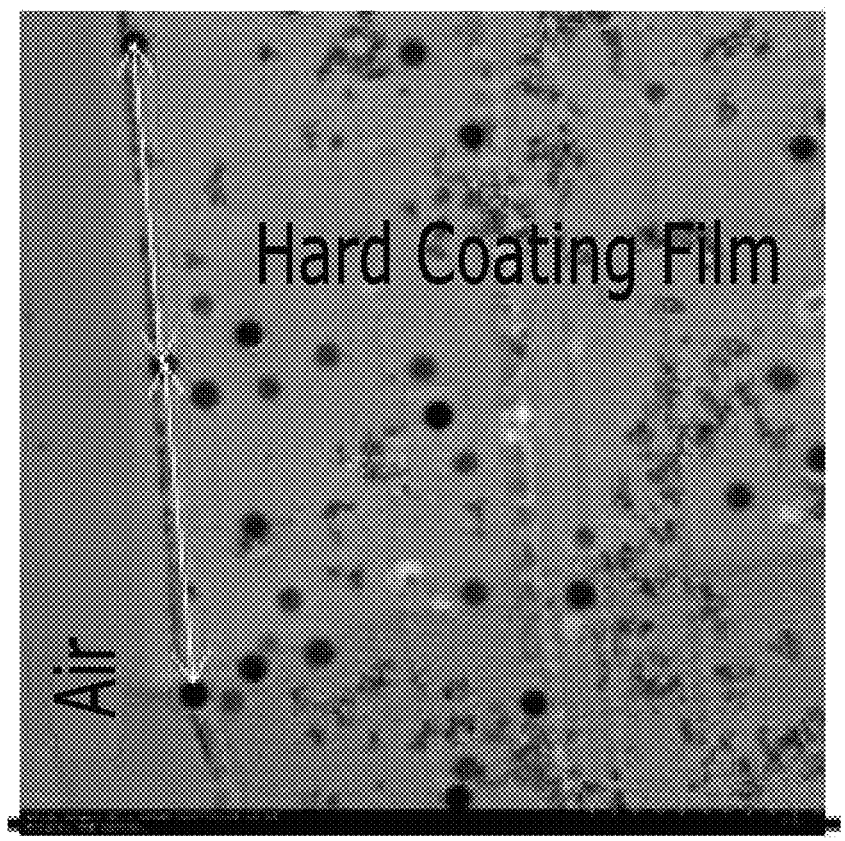

HARD COATING FILM

CROSS-REFERENCE TO RELATED APPLICATION(S)

The present application is a Continuation of International Application No. PCT/KR2018/010870, filed on Sep. 14, 2018, which claims the benefit of priority under Korean Patent Application No. 10-2017-0118861, filed on Sep. 15, 2017, the entire contents of which are fully incorporated herein by reference.

TECHNICAL FIELD

The present invention relates to a hard coating film used for the purpose of protecting the surface of a display, etc.

BACKGROUND ART

An image display surface in an image display device such as a liquid crystal display, a CRT display, a projection display, a plasma display, an electroluminescent display, etc., is required to be provided with scratch resistance in order to prevent appearance of scratches during handling. Improvement of scratch resistance of the image display surface in the image display device is generally achieved by forming a hard coating film on a base film or by using a hard coating film (optical laminate) which is additionally provided with optical functions such as an anti-reflective property, an anti-glare property, etc.

During a winding process of the hard coating film using a roll, a distance between the hard coating films becomes small, and in an extreme case, a blocking phenomenon occurs in which the hard coating films adhere to each other. When the hard coating films that adhere to each other are fed to travel on a line, the films are scratched when the films are peeled from the wound roll, or the films are scratched due to fluttering while travelling on the line or at the time of being in contact with a guide roll. This may cause a large decrease in yield.

Previously, several methods were proposed to prevent hard coating films from being scratched by applying an anti-blocking function to the surface of the hard coating film. For example, in order to prevent blocking, a technique of forming unevenness on the surface of the hard coating film by phase separation of an oligomer and a monomer was proposed. A technique for forming unevenness by adding particles into the hard coating film was also proposed in order to secure an anti-blocking property. However, with these known methods of forming unevenness, it is difficult to control uniform formation of unevenness. Therefore, coarse unevenness may be provided to cause drawbacks on the appearance, or when the unevenness is insufficiently formed, anti-blocking performance may be insufficient.

DISCLOSURE

Technical Problem

The present invention provides a hard coating film having excellent optical properties and an anti-blocking function while maintaining excellent physical properties.

Technical Solution

According to an embodiment of the present invention, a hard coating film is provided, including: a polymer binder resin; first inorganic particles which are dispersed in the polymer binder resin and have an average particle size of 5 nm or more and less than 70 nm; and second inorganic particles which are dispersed in the polymer binder resin and have an average particle size of 70 nm to 150 nm, wherein a content of the second inorganic particles having an average particle size of 70 nm to 150 nm is 4% by weight to 12% by weight, and a maximum amplitude (A) based on an average friction force is 0.15 or less in a graph for measuring a friction force with a TAC (triacetyl cellulose) film which is measured by applying a load of 400 g to the surface thereof.

Hereinafter, a hard coating film according to specific embodiments of the present invention will be described in more detail.

In the present invention, the terms "first", "second", and the like are used to describe a variety of components, and these terms are merely employed to differentiate one component from other components.

Further, (meth)acrylate covers both acrylate and methacrylate.

In addition, a fluorine-based compound refers to a compound containing at least one fluorine atom in the compound.

According to an embodiment of the present invention, a hard coating film is provided, including: a polymer binder resin; first inorganic particles which are dispersed in the resin and have an average particle size of 5 nm or more and less than 70 nm; and second inorganic particles which are dispersed in the polymer binder resin and have an average particle size of 70 nm to 150 nm, wherein a content of the second inorganic particles having an average particle size of 70 nm to 150 nm is 4% by weight to 12% by weight, and a maximum amplitude (A) based on an average friction force is 0.15 or less in a graph for measuring a friction force with a TAC (triacetyl cellulose) film which is measured by applying a load of 400 g to the surface.

Previously, in order to prevent blocking of the hard coating film, a method of forming unevenness on the surface thereof was known, but there was a problem that control for formation of uniform unevenness was difficult.

Accordingly, the present inventors conducted studies on hard coating films, and they found that when two kinds of inorganic particles having different average particle sizes are dispersed in a polymer binder resin, a content of second inorganic particles having an average particle size of 70 nm to 150 nm of the two kinds of inorganic particles is controlled at 4% by weight to 12% by weight, and a maximum amplitude (A) based on an average friction force is 0.15 or less in a graph for measuring a friction force with a TAC film which is measured by applying a load of 400 g to the surface thereof, the second inorganic particles dispersed in the hard coating film do not agglomerate and thus uniform unevenness is formed to exhibit an anti-blocking function, and the hard coating film has excellent physical properties and optical properties, thereby completing the present invention.

In particular, the hard coating film of the embodiment may include a predetermined amount of the second inorganic particles, together with the first inorganic particles, and thus it may have intrinsic uniform surface properties while having a low haze value and high light transmittance, thereby achieving the anti-blocking function.

More specifically, in a graph for measuring a friction force with a TAC film which is measured by applying a load of 400 g to the surface of the hard coating film, the a maximum amplitude (A) based on an average friction force of the hard coating film is 0.15 or less, 0.001 to 0.13, 0.005 to 0.10, 0.008 to 0.08, or 0.01 to 0.05. When the maximum amplitude (A) based on the average friction force of the hard coating film is 0.15 or less, the second inorganic particles distributed inside the hard coating film do not agglomerate, and particularly, the second inorganic particles which are located close to the surface of the hard coating film are uniformly distributed without agglomeration, thereby forming uniform unevenness, and as a result, the hard coating film exhibits an excellent anti-blocking function.

In contrast, when the maximum amplitude (A) is more than 0.15, the second inorganic particles agglomerate to form nonuniform unevenness, and thus haze occurs, leading to deterioration of optical properties and occurrence of a blocking phenomenon during a winding process of the hard coating film using a roll.

The friction force measurement graph of the hard coating film may be obtained by contacting a TAC film with the surface of the hard coating film, putting a sled with a load of 400 g thereon, and then measuring a friction force while moving the sled a specific distance at a constant test speed. In this regard, the friction force measurement graph is obtained as the friction force (y-axis) with respect to the test distance (x-axis), and the test distance is divided into a static test distance section and a kinetic test distance section.

In this regard, the static test distance is a section for measuring a static friction force, and the static friction force is defined as a friction force measured from the beginning of the measurement to a distance of 3 cm. Further, the kinetic test distance is a section for measuring a kinetic friction force that is determined as a mean value of the friction force which is measured in the section in which the sled moves, more specifically, in the kinetic test distance section.

The maximum amplitude (A) in the present invention, which is measured in the kinetic test distance section of the test distance sections, means a maximum value of the absolute values of differences between an average friction force and a maximum friction force or a minimum friction force after measuring the average friction force, the maximum friction force, and the minimum friction force in the kinetic test distance section.

Therefore, since a parameter for the maximum amplitude (A) is not measured from the starting point of the test distance but measured for the difference between the average friction force and the maximum friction force or the minimum friction force at the kinetic test distance, it may serve as a measurement for determining slipperiness of the hard coating film surface.

The content of the second inorganic particles is 4% by weight to 12% by weight, 5% by weight to 11% by weight, or 6% by weight to 9% by weight with respect to 100% by weight of the hard coating film. When the hard coating film includes the above-described amount of the second inorganic particles, the second inorganic particles distributed inside the hard coating film do not agglomerate, and particularly, the second inorganic particles which are located close to the surface of the hard coating film are uniformly distributed without agglomeration, thereby forming uniform unevenness.

On the polymer binder resin included in the hard coating film, two or more of the second inorganic particles are distributed, and a distance between the two or more of the second inorganic particles which are distributed on the polymer binder resin is 0.1 μm or more, 0.1 μm to 1.5 μm, 0.2 μm to 1.2 μm, or 0.5 μm to 1.0 μm. The distance between the second inorganic particles which are distributed on the polymer binder resin is based on a distance from the center of one second inorganic particle to the center of another second inorganic particle which is closest thereto. Therefore, since the distance between the two second inorganic particles, i.e., the shortest distance among the distances between the surfaces of the two second inorganic particles, is 0.1 μm or more, the second inorganic particles may not be in contact with each other, and furthermore, agglomeration between the second inorganic particles does not occur.

With regard to the at least two second inorganic particles included in the hard coating film, a distance between one surface of the hard coating film and the center of the second inorganic particle in a direction perpendicular to the one surface of the hard coating film may be 35 nm to 5.0 μm. In this regard, the center of the second inorganic particle means a middle point of the particle diameter of the second inorganic particle.

As mentioned above, since the particle diameter of the second inorganic particle is 70 nm to 150 nm, a lower limit of the radius of the second inorganic particle may be 35 nm. Therefore, since the distance between one surface of the hard coating film and the center of the second inorganic particle is controlled to 35 nm or more, the at least two second inorganic particles may be placed close to the surface of the hard coating film.

Further, since the distance between one surface of the hard coating film and the center of the second inorganic particle is controlled to 35 nm or more, the respective second inorganic particles may be placed only inside the hard coating film, which means that all of the individual second inorganic particles are distributed inside the hard coating film, and more specifically, means that not even a part of the second inorganic particles may be exposed to the outside of the hard coating film.

Meanwhile, if the second inorganic particle touches the surface of the hard coating film, for example, if the distance from one surface of the hard coating film to the center of the second inorganic particle is equal to the radius of the second inorganic particle, it may be considered that the second inorganic particle is substantially not exposed to the outside of the hard coating film.

The at least two second inorganic particles, in which the distance between one surface of the hard coating film and the center of the particle in a direction perpendicular to one surface of the hard coating film is 35 nm to 5.0 μm, may push up the binder resin to form unevenness on one surface of the hard coating film. Further, as mentioned above, since the second inorganic particles do not agglomerate, coarsening of the size of unevenness which is formed by the second inorganic particles does not occur, to control the size and distribution of unevenness.

The at least two second inorganic particles, in which the distance between one surface of the hard coating film and the center of the particle in a direction perpendicular to one surface of the hard coating film is 35 nm to 5.0 μm, may be adjacent to each other in a horizontal direction with respect to one surface of the hard coating film while being spaced apart by a distance of 0.1 μm to 1.5 μm. The distance of the second inorganic particles which are adjacent to each other in a horizontal direction to one surface of the hard coating film means an average of the distance between the centers of one second inorganic particle and the other neighboring second inorganic particle. In particular, since the average particle size of the second inorganic particle is 70 nm to 150 nm, and the average distance between the centers of the second inorganic particles which are adjacent to each other in a horizontal direction with respect to one surface of the hard coating film is at least 100 nm or more, the second inorganic particles may not be in contact with each other, and furthermore, agglomeration between the second inorganic particles may not occur.

If the average distance between the second inorganic particles is less than 100 nm, haze of the hard coating film increases to generate a problem that the surface thereof looks hazy. If the average distance is more than 1.5 μm, the anti-blocking property of the hard coating film may be deteriorated.

FIG. 1 is a cross-sectional TEM (transmission electron microscope) image of a hard coating film according to an embodiment of the present invention at 2500× magnification. According to this image, two or more of the second inorganic particles are placed close to the surface of the hard coating film. Further, an arrow in FIG. 1 indicates a method of measuring a distance between the second inorganic particles which are adjacent to each other in a horizontal direction with respect to one surface of the hard coating film. The shortest distance between the second inorganic particles which are adjacent to each other, as measured by the method, may be 450 nm to 1.7 μm, 480 nm to 1.6 μm, or 500 nm to 1.5 μm, and an average of the shortest distances is 500 nm to 1.5 μm, as mentioned above.

A height of unevenness formed on the hard coating film may be 1 nm to 50 nm, 5 nm to 45 nm, 10 nm to 40 nm, or 15 nm to 30 nm. If the height of unevenness is less than 1 nm, sufficient unevenness is not formed on the surface of the hard coating film, and the hard coating film may not exhibit the anti-blocking function. If the height of unevenness is more than 50 nm, there is a problem that haze is generated.

Meanwhile, an average distance between the unevennesses formed on the hard coating film may be 0.1 μm to 1.5 μm, 0.2 μm to 1.2 μm, or 0.5 μm to 1.0 μm. The average distance between the unevennesses means an average value of the distances from the center of one uneven part to the center of the other neighboring uneven part. If the average distance between the unevennesses is less than 0.1 μm, haze is generated, and if the average distance between the unevennesses is more than 1.5 μm, the space between the unevennesses on the surface of the hard coating film is too large, and thus the anti-blocking function may not be obtained.

The hard coating film includes two kinds of first inorganic particles having different average particle sizes. First, the first inorganic particle has an average particle size of 5 nm or more and less than 70 nm, 10 nm to 40 nm, or 15 nm to 30 nm. If the average particle size of the first inorganic particle is less than 5 nm, hardness of the hard coating film may become weak.

Meanwhile, an average particle size of the second inorganic particle is 70 nm to 150 nm, 75 nm to 140 nm, or 80 nm to 135 nm. If the average particle size of the second inorganic particle is less than 70 nm, unevenness with a sufficient size may not be formed, and thus the anti-blocking property may not be obtained.

The first inorganic particle and the second inorganic particle may be one or more selected from silica and a metal oxide, and the metal oxide means a metal oxide excluding silica which is metalloid oxide.

A content of the first inorganic particle may be 1% by weight to 30% by weight with respect to 100% by weight of the hard coating film.

Meanwhile, a reactive functional group or a compound containing a reactive functional group may be introduced onto the surfaces of the first inorganic particle and the second inorganic particle, respectively. The reactive functional group may include various functional groups which are known to participate in polymerization by stimulation such as by light, heat, etc. Specific examples of the reactive functional group may include a (meth)acrylate group, an epoxide group, a vinyl group, and a thiol group.

Further, the compound containing a reactive functional group may be introduced onto the surfaces of the first inorganic particle and the second inorganic particle, respectively, and examples of the compound containing a reactive functional group may include a silane compound and a hydroxide compound containing a reactive functional group.

For example, the silane compound containing a reactive functional group may include vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-methacryloxypropyltriethoxysilane, 3-methacryloxypropyltrimethoxysilane, 3-methacryloxypropylmethyldimethoxysilane, 3-methacryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatopropyltriethoxysilane, etc. These compounds may be used alone or as a mixture of two or more thereof.

Since the reactive functional group or the compound containing a reactive functional group is introduced onto the surfaces of the first inorganic particle and the second inorganic particle, respectively, the reactive functional group may form a crosslinking bond with the polymer binder resin during the formation of the hard coating film, and the particles are well dispersed in the binder resin. In contrast, if the particles have no reactive functional groups, the particles agglomerate with each other. Accordingly, the hard coating film finally manufactured may have improved mechanical properties and anti-blocking property without haze generation.

The hard coating film may include the polymer binder resin including one or more selected from the group consisting of an acrylic resin, an epoxy group, a vinyl group, and a thiol group.

The hard coating film may further include a fluorine-based compound containing a reactive functional group, and the fluorine-based compound containing a reactive functional group may form a crosslinking bond with the polymer binder resin. The reactive functional group contained in the fluorine-based compound may be the same as or different from the reactive group which is introduced into the first inorganic particle and the second inorganic particle. For example, the reactive functional group contained in the fluorine-based compound may be a (meth)acrylate group, an epoxide group, a vinyl group, or a thiol group, or a silane compound or a hydroxide compound containing the (meth)acrylate group, the epoxide group, the vinyl group, or the thiol group.

The at least two second inorganic particles, in which the distance between one surface of the hard coating film and the center of the particle in a direction perpendicular to one surface of the hard coating film is 35 nm to 5.0 μm, may push up the binder resin, thereby forming unevenness on one surface of the hard coating film. In particular, since the second inorganic particles do not agglomerate, it is possible to obtain a hard coating film having unevenness which is uniformly formed on the surface thereof.

A thickness of the hard coating film may be 500 nm to 30 µm, 1 µm to 25 µm, 5 µm to 20 µm, or 8 µm to 15 µm. If the thickness of the hard coating film is less than 500 nm, hardness of the hard coating film may be deteriorated, and if the thickness is more than 30 µm, the hard coating film may severely curl, resulting in poor processability.

Hereinafter, a method of manufacturing the hard coating film will be described, but the method of manufacturing the hard coating film is not limited thereto.

First, a transparent base film and a composition for the hard coating film are prepared. The composition may include: photocurable and/or thermal curable monomers or oligomers; first inorganic particles having an average particle size of 5 nm or more and less than 70 nm and having a reactive functional group introduced onto the surface thereof; and second inorganic particles having an average particle size of 70 nm to 150 nm and having a reactive functional group introduced onto the surface thereof.

Next, the composition for the hard coating film is coated onto the transparent base film, followed by drying. The coating method is not particularly limited, as long as it is used to uniformly coat the film. A variety of methods, such as a spin coating method, a dipping method, a spraying method, a die coating method, a bar coating method, a roll coating method, a meniscus coating method, a flexo-printing method, a screen printing method, and a feed coater method, may be used. A drying method may be exemplified by vacuum drying or heat drying, or a combination thereof. For example, when a ketone-based solvent is used as a solvent, the drying process may be generally performed at a temperature ranging from room temperature to 80° C., or 40° C. to 60° C., for 20 s to 3 min, or 30 s to 1 min.

In this regard, the first inorganic particles and the second inorganic particles uniformly dispersed in the composition for the hard coating film are uniformly dispersed inside the hard coating film during the drying process, and in particular, there is no agglomeration between the second inorganic particles, in which the distance between one surface of the hard coating film and the center of the particle in a direction perpendicular to one surface of the hard coating film is 35 nm to 5.0 µm.

Thereafter, the coating film which was dried after being coated with the composition may be cured by light irradiation and/or heating. As a result, the photocurable and/or thermal curable monomers or oligomers are polymerized, and the first inorganic particles and the second inorganic particles may form crosslinking bonds with the photocurable and/or thermal curable monomers or oligomers, thereby forming the hard coating film. Accordingly, the second inorganic particles, in which the distance between one surface of the hard coating film and the center of the particle is 35 nm to 5.0 µm, may push up the binder resin to form unevenness on one surface of the hard coating film. Particularly, since the second inorganic particles do not agglomerate, it is possible to obtain the hard coating film having unevenness which is uniformly formed on the surface thereof.

In the light irradiation, ultraviolet light, visible light, an electron beam, ionizing radiation, etc. may be mainly used. In the case of ultraviolet curing, ultraviolet rays emitted from a light source such as an ultra-high pressure mercury lamp, a high pressure mercury lamp, a low pressure mercury lamp, a carbon arc lamp, a xenon arc lamp, a metal halide lamp, etc. may be used. An irradiation dose of light source is 50 mJ/cm$^2$ to 5000 mJ/cm$^2$ in terms of accumulative exposure at an ultraviolet wavelength of 365 nm. The heating may be generally performed at a temperature of 40° C. to 120° C. Alternatively, the reaction may be allowed by leaving the film at room temperature for 24 hours or more.

Advantageous Effects

According to the present invention, a hard coating film having excellent optical properties due to low haze and excellent anti-blocking function while maintaining excellent physical properties of scratch resistance, pencil hardness, etc., is provided.

BRIEF DESCRIPTION OF THE DRAWINGS

FIG. 1 is a cross-sectional transmission electron microscopic image of a hard coating film according to an embodiment of the present invention.

DETAILED DESCRIPTION OF THE EMBODIMENTS

The present invention will be described in more detail in the following examples. However, the following examples are for illustrative purposes only, and the content of the present invention is not intended to be limited thereby.

EXAMPLES AND COMPARATIVE EXAMPLES: MANUFACTURE OF HARD COATING FILM

Example 1

Solid components of 91 g of pentaerythritol triacrylate (PETA), 3 g of first silica particles having an average particle size of 23 nm (surface treatment: 3-methacryloyloxypropylmethyldimethoxysilane), 4 g of second silica particles having an average particle size of 132 nm (surface treatment: 3-methacryloyloxypropylmethyldimethoxysilane), 0.05 g of a fluorine-based acrylate (RS-537, DIC), and 1.95 g of a photo-initiator (Irgacure 184, Ciba) were diluted in a MEK (methyl ethyl ketone) solvent at a solid concentration of 45% by weight to prepare a composition for a hard coating film.

A triacetyl cellulose film was coated with the composition using a #10 Mayer bar, dried at 60° C. for 1 minute, and irradiated with UV at a dose of 150 mJ/cm$^2$ to manufacture a hard coating film having a thickness of about 5 µm to 6 µm.

Example 2

Solid components of 87 g of pentaerythritol triacrylate (PETA), 7 g of first silica particles having an average particle size of 15 nm (surface treatment: 3-methacryloyloxypropylmethyldimethoxysilane), 4 g of second silica particles having an average particle size of 110 nm (surface treatment: 3-methacryloyloxypropylmethyldimethoxysilane), 0.1 g of a fluorine-based acrylate (RS-537, DIC), and 1.9 g of a photo-initiator (Irgacure 184, Ciba) were diluted in a MEK (methyl ethyl ketone) solvent at a solid concentration of 44% by weight to prepare a composition for a hard coating film.

A hard coating film was manufactured using the above composition in the same manner as in Example 1.

Example 3

Solid components of 88 g of pentaerythritol triacrylate (PETA), 4 g of first silica particles having an average particle size of 23 nm (surface treatment: 3-methacryloyloxypropylmethyldimethoxysilane), 6 g of second silica particles having an average particle size of 132 nm (surface treatment: 3-methacryloyloxypropylmethyldimethoxysilane), 0.05 g of a fluorine-based acrylate (RS-537, DIC), and 1.95 g of a photo-initiator (Irgacure 184, Ciba) were diluted in a MEK (methyl ethyl ketone) solvent at a solid concentration of 44% by weight to prepare a composition for a hard coating film.

A hard coating film was manufactured using the above composition in the same manner as in Example 1.

Example 4

Solid components of 41.2 g of pentaerythritol triacrylate (PETA), 41.2 g of dipentaerythritol hexaacrylate (DPHA), 12 g of first silica particles having an average particle size of 15 nm (surface treatment: 3-methacryloyloxypropylmethyldimethoxysilane), 4 g of second silica particles having an average particle size of 82 nm (surface treatment: 3-methacryloyloxypropylmethyldimethoxysilane), 0.1 g of a fluorine-based acrylate (RS-537, DIC), and 1.5 g of a photo-initiator (Irgacure 184, Ciba) were diluted in a MEK (methyl ethyl ketone) solvent at a solid concentration of 45% by weight to prepare a composition for a hard coating film.

A hard coating film was manufactured using the above composition in the same manner as in Example 1.

Example 5

Solid components of 91 g of pentaerythritol triacrylate (PETA), 3 g of first silica particles having an average particle size of 23 nm (surface treatment: 3-methacryloyloxypropylmethyldimethoxysilane), 4 g of second silica particles having an average particle size of 132 nm (surface treatment: 3-methacryloyloxypropylmethyldimethoxysilane), 0.05 g of a fluorine-based acrylate (RS-537, DIC), and 1.95 g of a photo-initiator (Irgacure 184, Ciba) were diluted in a MEK (methyl ethyl ketone) solvent at a solid concentration of 45% by weight to prepare a composition for a hard coating film.

A hard coating film was manufactured using the above composition in the same manner as in Example 1.

Example 6

Solid components of 84 g of pentaerythritol triacrylate (PETA), 3 g of first silica particles having an average particle size of 15 nm (surface treatment: 3-methacryloyloxypropylmethyldimethoxysilane), 11 g of second silica particles having an average particle size of 110 nm (surface treatment: 3-methacryloyloxypropylmethyldimethoxysilane), 0.1 g of a fluorine-based acrylate (RS-537, DIC), and 1.9 g of a photo-initiator (Irgacure 184, Ciba) were diluted in a MEK (methyl ethyl ketone) solvent at a solid concentration of 44% by weight to prepare a composition for a hard coating film.

A hard coating film was manufactured using the above composition in the same manner as in Example 1.

Example 7

Solid components of 85 g of pentaerythritol triacrylate (PETA), 4 g of first silica particles having an average particle size of 23 nm (surface treatment: 3-methacryloyloxypropylmethyldimethoxysilane), 9 g of second silica particles having an average particle size of 132 nm (surface treatment: 3-methacryloyloxypropylmethyldimethoxysilane), 0.05 g of a fluorine-based acrylate (RS-537, DIC), and 1.95 g of a photo-initiator (Irgacure 184, Ciba) were diluted in a MEK (methyl ethyl ketone) solvent at a solid concentration of 44% by weight to prepare a composition for a hard coating film.

A hard coating film was manufactured using the above composition in the same manner as in Example 1.

Comparative Example 1

A composition and a hard coating film were prepared in the same manner as in Example 1, except that 4 g of pentaerythritol triacrylate (PETA) was used instead of the second silica particles in Example 1.

Comparative Example 2

A composition and a hard coating film were prepared in the same manner as in Example 2, except that second silica particles having an average particle size of 200 nm were used instead of the second silica particles having an average particle size of 110 nm in Example 2.

Comparative Example 3

A composition and a hard coating film were prepared in the same manner as in Example 2, except that non-surface treated second silica particles were used in Example 2.

Comparative Example 4

A composition and a hard coating film were prepared in the same manner as in Example 2, except that second silica particles having an average particle size of 50 nm were used instead of the second silica particles having an average particle size of 110 nm in Example 2.

Experimental Example: Measurement of Physical Properties of Hard Coating Film

Experiments of the following items were performed with respect to the hard coating films obtained in the examples and comparative examples. Further, measurement results are shown in the following Table 1.

1. Measurement of Scratch Resistance

Each surface of the hard coating films obtained in the examples and comparative examples was doubly rubbed at a speed of 27 rpm 10 times with steel wool (#0000) under a load. The maximum load under which one or fewer scratches of 1 cm or less was observed with the naked eye was measured.

2. Measurement of Pencil Hardness

Pencil hardness of each of the hard coating films obtained in the examples and comparative examples was evaluated with a pencil tester in accordance with ASTM D3363.

3. Measurement of Haze

Haze was measured at three spots of each of the hard coating films obtained in the examples and comparative examples using HAZEMETER HM-150 of Murakami Color Research Laboratory in accordance with the JIS K7105 standard, and it was determined whether a mean value was 0.5 or less.

4. Measurement of Friction Force

A TAC (triacetyl cellulose) film was placed on the surface of each of the hard coating films obtained in the examples and comparative examples, and a friction force was measured for a total test distance of 10 cm at a test speed of 18 cm/min while applying a load of 400 g thereto. A graph of the friction force was obtained. Specifically, the friction force measurement graph was obtained by contacting the TAC film with the surface of the hard coating film, putting a sled with a load of 400 g thereon, and then measuring a friction force while pulling the sled for a total test distance of 10 cm at a test speed of 18 cm/min using a friction tester (FP-2260, manufactured by Thwing-Albert Instrument Company). Thereafter, an average friction force, a maximum friction force, and a minimum friction force were obtained in a kinetic test distance section in the obtained friction force measurement graph, and then a maximum value of the absolute values of the differences between the average friction force and the maximum friction force or the minimum friction force was defined as a maximum amplitude (A). In this regard, the static test distance is a section up to a test distance of 3 cm, and the kinetic test distance is a section from a test distance of 3 cm to a test distance of 10 cm. The friction test in this application is the same as ASTM D1894 except that a sled bears a load of 400 g, instead of 200 g.

5. Evaluation of Presence or Absence of Blocking Generation

A TAC film was placed on the surface of each of the hard coating films obtained in the examples and comparative examples, a weight of 3 kg was put thereon, and then left for 24 hours. Thereafter, it was determined whether the hard coating film and the TAC film adhered to each other.

TABLE 1

| | Scratch resistance (g) | Pencil hardness | Haze | Maximum amplitude (A) | Blocking generation |
|---|---|---|---|---|---|
| Example 1 | 1000 | 3H | 0.1 | 0.04 | X |
| Example 2 | 1000 | 3H | 0.2 | 0.08 | X |
| Example 3 | 1000 | 3H | 0.1 | 0.1 | X |
| Example 4 | 1000 | 3H | 0.1 | 0.05 | X |
| Example 5 | 1000 | 3H | 0.2 | 0.09 | X |
| Example 6 | 1000 | 3H | 0.2 | 0.13 | X |
| Example 7 | 1000 | 3H | 0.1 | 0.1 | X |
| Comparative Example 1 | 1000 | 3H | 0.2 | 0.48 | ○ |
| Comparative Example 2 | 1000 | 3H | 0.7 | 0.15 | X |
| Comparative Example 3 | 1000 | 3H | 0.6 | 0.17 | ○ |
| Comparative Example 4 | 1000 | 3H | 0.2 | 0.3 | ○ |

As shown in Table 1, the hard coating films of Examples 1 to 7 were found to show no blocking phenomenon due to low friction forces. The hard coating films of Examples 1 to 7 were also found to have excellent optical properties without haze occurrence.

6. XPS (X-Ray Photoelectron Spectroscopy) Analysis

The surface of the hard coating film of Example 1 was analyzed by XPS, and the result is shown in the following Table 2.

TABLE 2

| Component | F | O | C | Si |
|---|---|---|---|---|
| Content (at %) | 12.0 | 30.9 | 49.5 | 7.6 |

As shown in Table 2, it was confirmed that carbon (C) and oxygen (O) which are components of the polymer binder were mainly detected on the surface of the hard coating film of Example 1, suggesting that the inorganic particles were not exposed to the outside of the hard coating film.

7. Measurement of Diameter of Inorganic Particles Using Transmission Electron Microscope (TEM)

Diameter of inorganic nanoparticles was measured by using Transmission Electron Microscopy (TEM) in the magnitude of 100,000. The hard coating film was embedded into the epoxy resin, and sliced with an ultramicrotome (thickness of 150 nm). After transferred onto a Cu grid, five images of inorganic nanoparticles were captured. The diameter of each inorganic nanoparticle of five images was measured and the average value could be calculated.

The invention claimed is:

1. A hard coating film comprising:
   a polymer binder resin;
   first inorganic particles dispersed in the polymer binder resin and having an average particle size of 5 nm or more to less than 70 nm; and
   second inorganic particles dispersed in the polymer binder resin and having an average particle size of 70 nm to 150 nm,
   wherein a content of the second inorganic particles having an average particle size of 70 nm to 150 nm is 4% by weight to 12% by weight,
   a maximum amplitude (A) based on an average friction force is 0.15 or less in a graph for measuring a friction force with a triacetyl cellulose (TAC) film which is measured by applying a load of 400 g to the surface thereof, and
   wherein the maximum amplitude (A) is a maximum value of the absolute values of the difference between an average friction force and a maximum friction force and the difference between the average friction force and a minimum friction force, after measuring the average friction force, the maximum friction force, and the minimum friction force in a kinetic test distance section of the friction force measurement graph.

2. The hard coating film of claim 1,
   wherein at least two second inorganic particles are distributed on the polymer binder resin while being spaced apart by a distance of 0.1 μm or more.

3. The hard coating film of claim 1,
   wherein the second inorganic particles having an average particle size of 70 nm to 150 nm are dispersed in the polymer binder resin with no agglomeration.

4. The hard coating film of claim 1,
   wherein, with regard to at least two second inorganic particles, a distance between one surface of the hard coating film and a center of the second inorganic particles in a direction perpendicular to the one surface of the hard coating film is 35 nm to 5.0 μm.

5. The hard coating film of claim 4,
   wherein the at least two second inorganic particles, of which the distance between one surface of the hard coating film and the center of the particle in a direction perpendicular to one surface of the hard coating film is 35 nm to 5.0 μm, are adjacent to each other in a horizontal direction with respect to one surface of the hard coating film while being spaced apart by the distance of 0.1 μm to 1.5 μm.

6. The hard coating film of claim 1,
   wherein the second inorganic particles are placed only inside the hard coating film.

7. The hard coating film of claim 1,
   wherein at least one reactive functional group is introduced onto surfaces of the first inorganic particles and the second inorganic particles.

8. The hard coating film of claim 7,
wherein one or more reactive functional groups selected from the group consisting of a (meth)acrylate group, an epoxide group, a vinyl group, and a thiol group, or a compound including the reactive functional group, is introduced onto the first inorganic particles and the second inorganic particles, respectively.

9. The hard coating film of claim 8,
wherein the compound having the reactive functional group is a silane compound or a hydroxide compound including one or more reactive functional groups selected from the group consisting of a (meth)acrylate group, an epoxide group, a vinyl group, and a thiol group.

10. The hard coating film of claim 7,
wherein the reactive functional group introduced onto each surface of the first inorganic particles and the second inorganic particles forms a crosslinking bond with the polymer binder resin.

11. The hard coating film of claim 1,
wherein the polymer binder resin includes one or more selected from the group consisting of an acrylic resin, an epoxy group, a vinyl group, and a thiol group.

12. The hard coating film of claim 1,
further comprising a fluorine-based compound including a reactive functional group, which forms a crosslinking bond with the polymer binder resin.

13. The hard coating film of claim 1,
wherein a content of the first inorganic particles is 1% by weight to 30% by weight with respect to 100% by weight of the hard coating film.

14. The hard coating film of claim 1,
wherein the first inorganic particles and the second inorganic particles are one or more selected from the group consisting of silica and a metal oxide.

15. The hard coating film of claim 1,
wherein at least one surface of the hard coating film has two or more unevennesses, and
a height of the unevenness is 1 nm to 50 nm.

16. The hard coating film of claim 15,
wherein an average distance between the unevennesses is 0.1 μm to 1.5 μm.

17. The hard coating film of claim 1,
wherein a thickness of the hard coating film is 500 nm to 30 μm.

* * * * *